(12) United States Patent
Sutarwala et al.

(10) Patent No.: US 9,276,276 B2
(45) Date of Patent: Mar. 1, 2016

(54) APPARATUS FOR ELECTRONIC DEVICES WITH VIBRATORS AND FUEL CELLS

(75) Inventors: Taha Shabbir Husain Sutarwala, Mississauga (CA); Philip James Prociw, Waterloo (CA); Yu William Feng, Waterloo (CA)

(73) Assignee: BlackBerry Limited, Waterloo (CA)

( * ) Notice: Subject to any disclaimer, the term of this patent is extended or adjusted under 35 U.S.C. 154(b) by 687 days.

(21) Appl. No.: 13/604,055

(22) Filed: Sep. 5, 2012

(65) Prior Publication Data
US 2014/0065497 A1    Mar. 6, 2014

(51) Int. Cl.
*H01M 8/06* (2006.01)
*H01M 8/04* (2006.01)

(52) U.S. Cl.
CPC ...... *H01M 8/04186* (2013.01); *H01M 8/04201* (2013.01); *H01M 2250/30* (2013.01); *Y02B 90/18* (2013.01); *Y02E 60/50* (2013.01)

(58) Field of Classification Search
CPC ............... H01M 2250/30; H01M 8/04186; H01M 8/04201; Y02B 90/18; Y02E 60/50
See application file for complete search history.

(56) References Cited

U.S. PATENT DOCUMENTS

| | | | |
|---|---|---|---|
| 2005/0282047 A1 | 12/2005 | Kimura et al. | |
| 2005/0282054 A1 | 12/2005 | Ishida et al. | |
| 2006/0204802 A1* | 9/2006 | Specht | 429/22 |
| 2012/0145359 A1 | 6/2012 | Rich et al. | |

FOREIGN PATENT DOCUMENTS

JP     2006332018 A     12/2006

OTHER PUBLICATIONS

Office Action dated Jul. 8, 2013, issued against corresponding European Patent Application No. 12183070.7.
Examiner's Report dated Jun. 17, 2014, issued on corresponding Canadian Patent Application No. 2,820,909.
Office Action dated Jan. 13, 2015, issued on corresponding European Patent Application No. 12183070.7.
Extended European Search Report dated Feb. 13, 2013, issued against corresponding European Patent Application No. 12183070.7.

* cited by examiner

*Primary Examiner* — Carlos Barcena
(74) *Attorney, Agent, or Firm* — Geoffrey deKleine; Borden Ladner Gervais LLP

(57) ABSTRACT

The mechanical energy of an actuator is used for producing vibration alerts in a portable electronic device. The same mechanical energy is also utilized to control the flow of fuel or to mix the fuel in a fuel cell of the portable electronic device. Thus, the flow of fuel into a reaction area of a fuel cell is controlled or fuel is mixed in a fuel storage area of a fuel cell assembly. Such fuel flow control and mixing is performed passively whenever a vibration alert occurs, or is performed actively in response to monitoring the status of the fuel cell assembly.

18 Claims, 9 Drawing Sheets

_US 9,276,276 B2_

APPARATUS FOR ELECTRONIC DEVICES WITH VIBRATORS AND FUEL CELLS

FIELD

The present disclosure relates generally to electronic devices. More particularly, the present disclosure relates to portable electronic devices with vibrators and fuel cells.

BACKGROUND

Some portable electronic devices having fuel cells for charging internal batteries and/or directly powering device functions. Devices with fuel cells often also include additional components (e.g., fuel conditioners, fuel pumps, heat exchangers) and routines for ensuring proper operation of the fuel cell. Active fuel cell management can increase the cost and complexity of and require additional components take up valuable space in a portable device.

BRIEF DESCRIPTION OF THE DRAWINGS

Embodiments of the present disclosure will now be described, by way of example only, with reference to the attached Figures.

DETAILED DESCRIPTION

Figure 1:
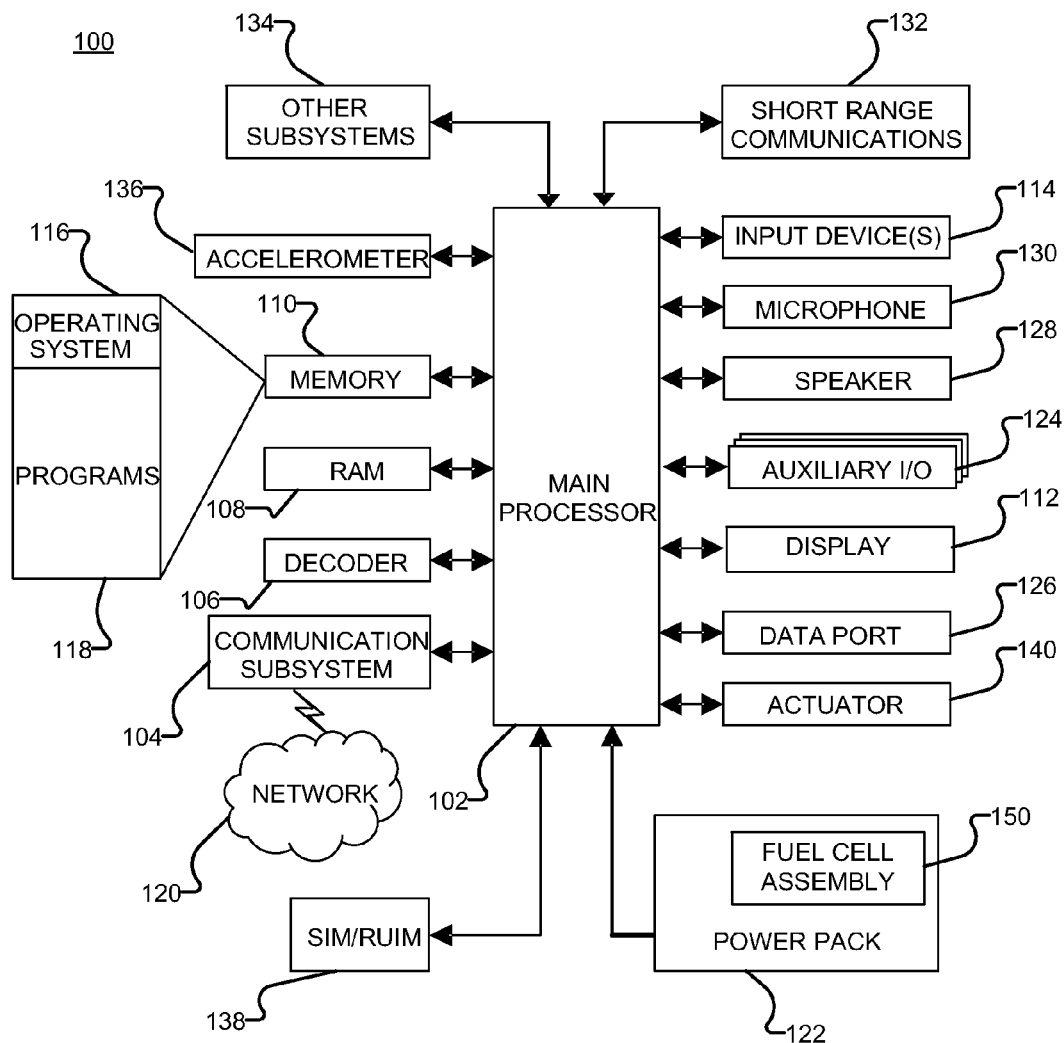
FIG. 1 is a simplified block diagram of components including internal components of a portable electronic device.

Generally, the present disclosure provides apparatus and methods for efficiently harnessing the mechanical energy of actuators used for producing vibration alerts in portable electronic devices to control the flow of fuel and mix the fuel in devices with fuel cells. Embodiments disclosed herein may be used, for example, to control the inlet of fuel into a reaction area of a fuel cell to periodically introduce new fuel, and/or to mix fuel in a fuel tank. Such techniques may be especially useful with fuel cells that use liquid fuel.

In one aspect there is provided a portable electronic device including a fuel cell assembly, an actuator for inducing vibration in the portable electronic device, the actuator comprising a fixed portion and a moveable portion, and, a linkage extending between the actuator and the fuel cell assembly having a first end connected to the moveable portion of the actuator and a second end coupled to a portion of the fuel cell assembly to transfer motion of the actuator to a portion of the fuel cell assembly.

In another aspect there is provided a method for controlling fuel flow in a portable electronic device comprising a fuel cell assembly and an actuator for inducing vibration in the portable electronic device, the fuel cell assembly comprising a reaction area and a conduit for controlling fuel flow to the reaction area, the actuator comprising a fixed portion and a moveable portion. The method comprises providing a linkage extending between the actuator and the fuel cell assembly, the linkage having a first end connected to the moveable portion of the actuator and a second end moveable to open and close the conduit, and activating the actuator to control fuel flow to the reaction area of the fuel cell assembly.

In another aspect there is provided a method for mixing fuel in a portable electronic device comprising a fuel cell assembly and an actuator for inducing vibration in the portable electronic device, the fuel cell assembly comprising a fuel storage area, the actuator comprising a fixed portion and a moveable portion. The method comprises providing a linkage extending between the actuator and the fuel cell assembly, the linkage having a first end connected to the moveable portion of the actuator and a second end coupled to the fuel storage area, and activating the actuator to mix fuel in fuel storage area of the fuel cell assembly.

In another aspect there is provided a portable electronic device comprising a fuel cell assembly, an actuator for inducing vibration in the portable electronic device, the actuator comprising a fixed portion and a moveable portion, and means for coupling the moveable portion of the actuator to a portion of the fuel cell assembly for transferring motion of the actuator to the portion of the fuel cell assembly.

Other aspects and features of the present disclosure will become apparent to those ordinarily skilled in the art upon review of the following description of specific embodiments in conjunction with the accompanying figures. It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 120. The wireless network 120 may be any type of wireless network, including, but not limited to, data wireless networks, voice wireless networks, and networks that support both voice and data communications.

The processor 102 interacts with other components, such as Random Access Memory (RAM) 108, memory 110, an input device 114, an auxiliary input/output (I/O) subsystem 124, the data port 126, a speaker 128, a microphone 130, short-range communications 132, and other device subsystems 134. The processor 102 may interact with an orientation sensor such as an accelerometer 136 that may be utilized to detect direction of gravitational forces or gravity-induced reaction forces. The processor 102 further interacts with a display 112. The display 112 may be a touch-sensitive display or, alternatively, may not be touch-sensitive, such as a liquid crystal display (LCD), for example. A power pack 122, such as one or more rechargeable batteries or a port to an external power supply, powers the portable electronic device 100.

To identify a subscriber for network access, the portable electronic device 100 uses a Subscriber Identity Module or a Removable User Identity Module (SIM/RUIM) card 138 for communication with a network, such as the wireless network 120. Alternatively, user identification information may be programmed into memory 110.

The portable electronic device 100 includes an operating system 116 and software programs or components 118 that are executed by the processor 102 and are typically stored in a persistent, updatable store such as the memory 110. Additional applications or programs may be loaded onto the portable electronic device 100 through the wireless network 120, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 120 through the communication subsystem 104. For voice communications, the overall operation of the portable electronic device 100 is similar. The speaker 128 outputs audible information converted from electrical signals, and the microphone 130 converts audible information into electrical signals for processing.

The processor 102 further interacts with an actuator 140. Actuator 140 may be utilized to induce (generate or produce or otherwise cause) physical motions (which for simplicity may also be referred to as vibrations) in the portable electronic device 100 to provide vibration alerts to a user (e.g., when a message or phone call is received, when an appointment or reminder is scheduled, when a timer expires, etc.).

The power pack 122 of the portable electronic device 100 includes a fuel cell assembly 150. The fuel cell assembly 150 may, for example, be connected to provide charging current to one or more rechargeable batteries, provide supplemental power for the portable electronic device 100 during periods of high demand, power certain components of the portable electronic device 100 directly, and/or provide primary power for the portable electronic device 100.

Figure 2A:
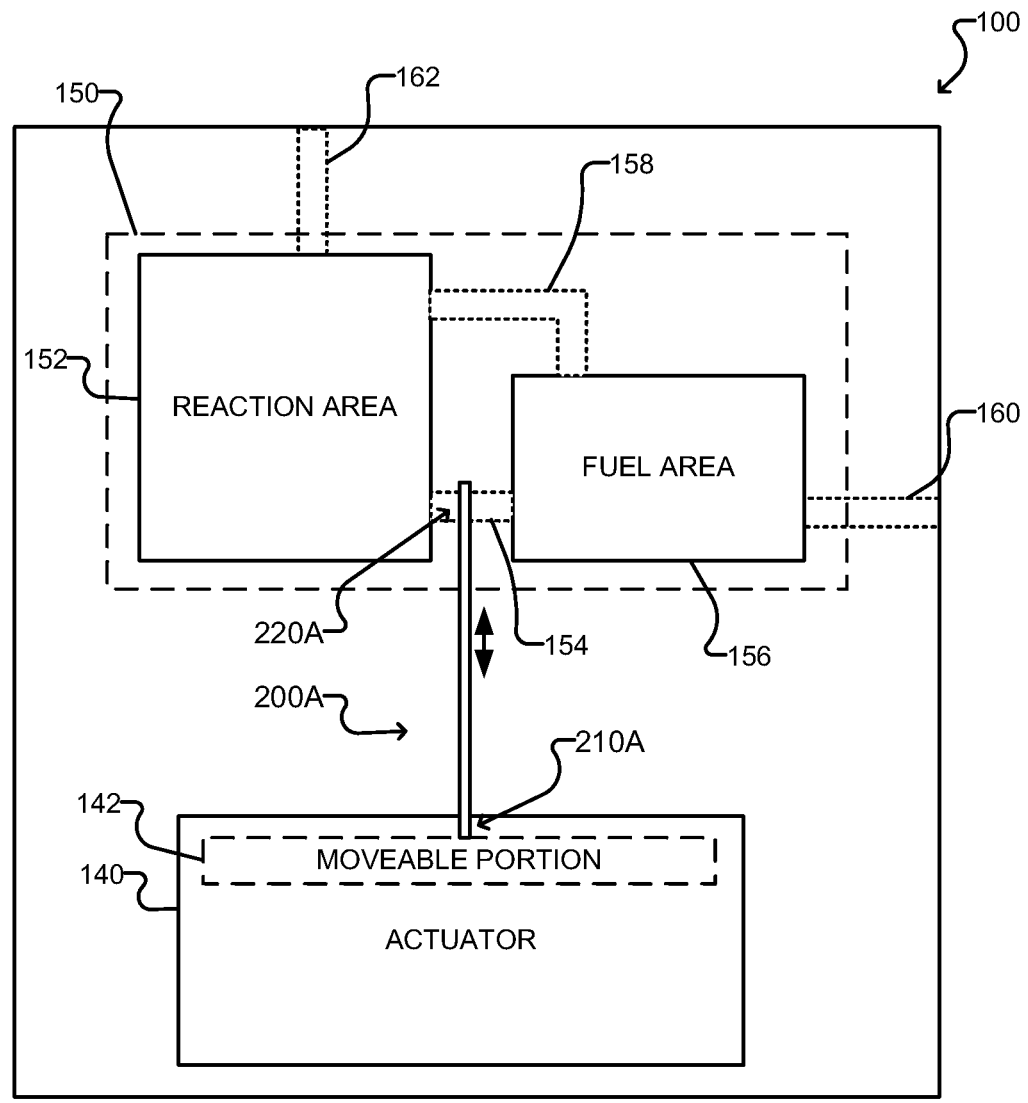
FIG. 2A schematically illustrates a portable electronic device with a fuel cell and a vibration actuator according to one embodiment.
Figure 2B:
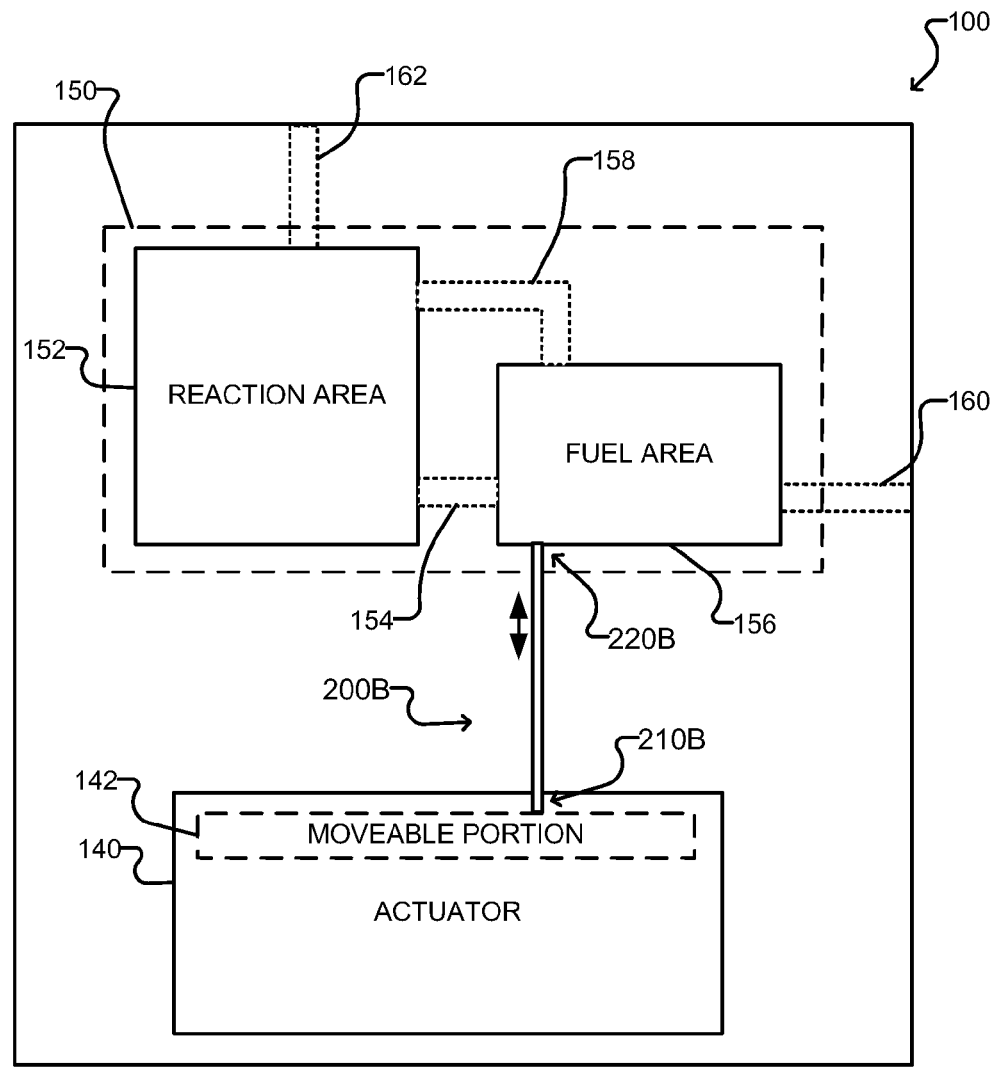
FIG. 2B schematically illustrates a portable electronic device with a fuel cell and a vibration actuator according to another embodiment.
Figure 2C:
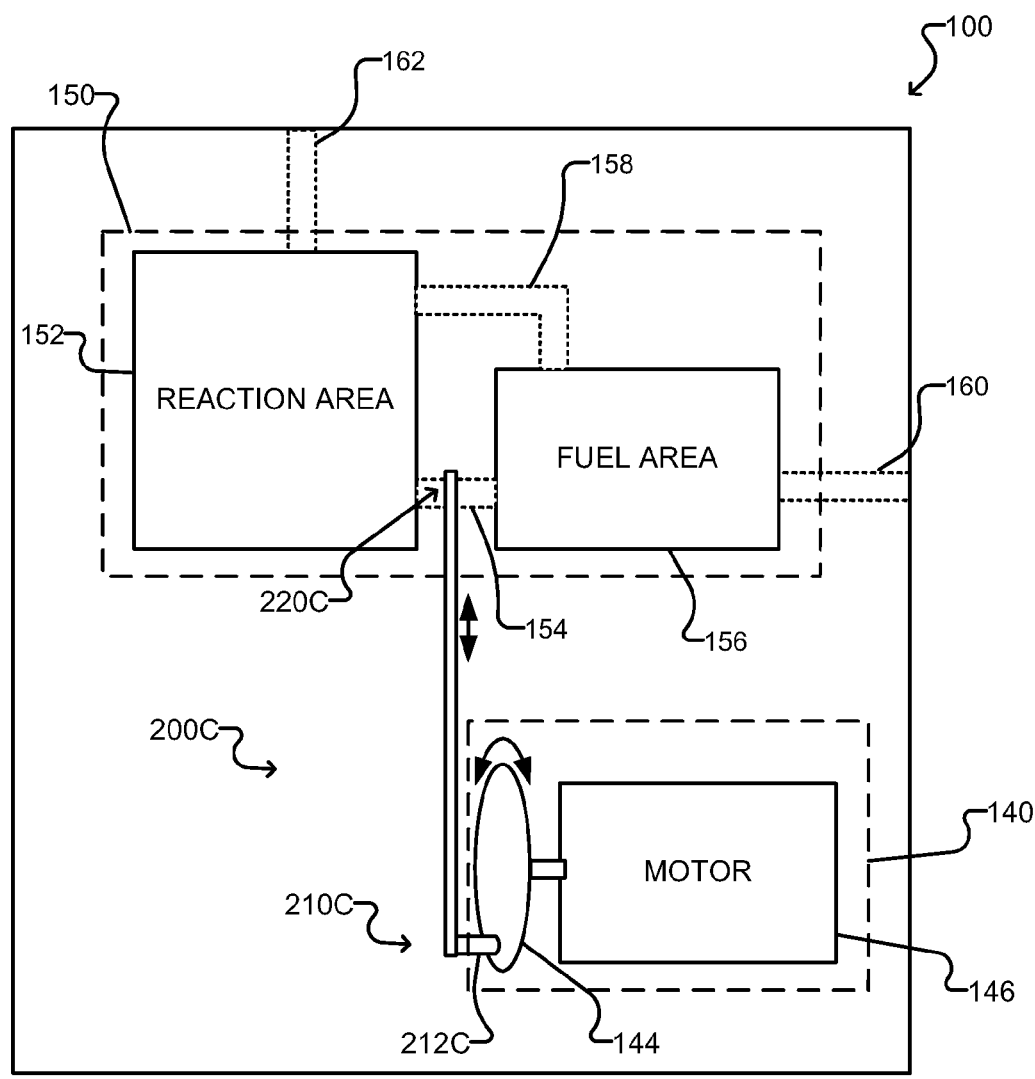
FIG. 2C schematically illustrates a portable electronic device with a fuel cell and a vibration actuator according to another embodiment.
Figure 2D:
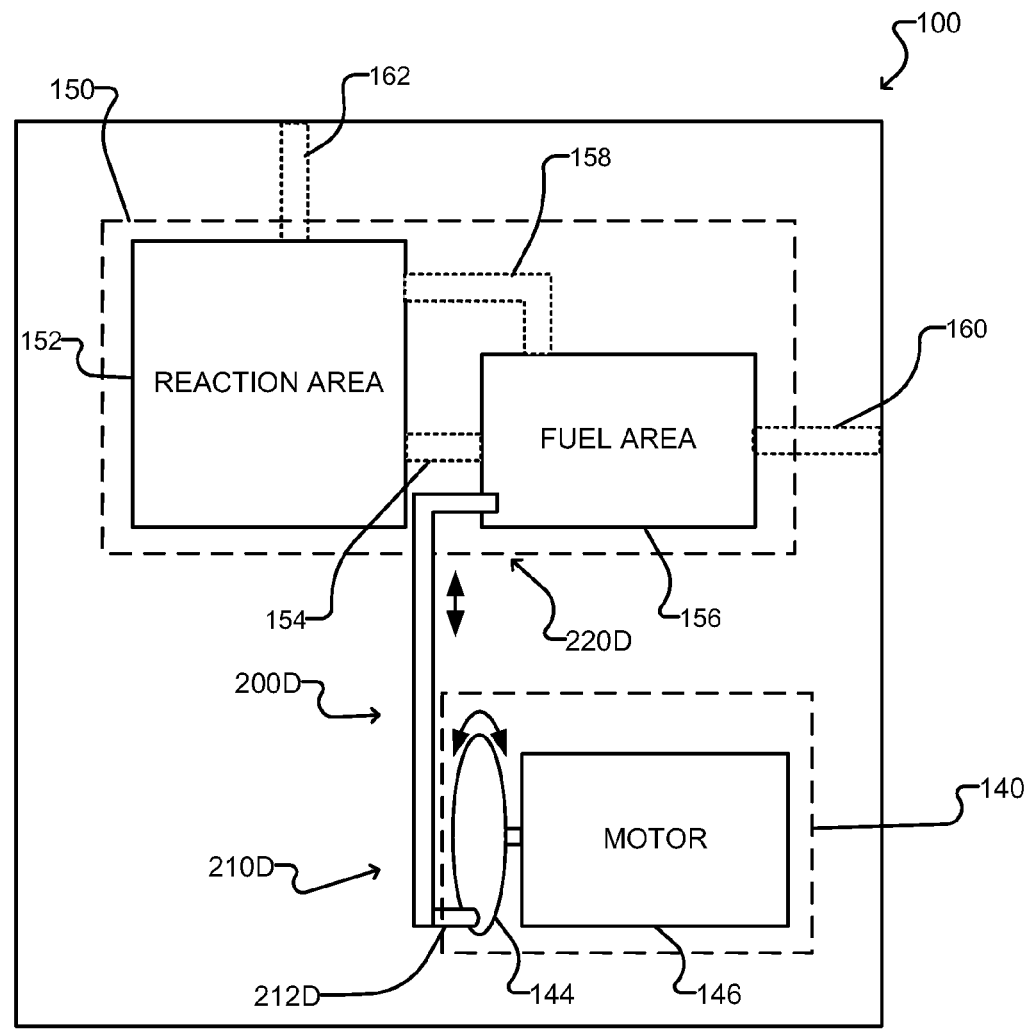
FIG. 2D schematically illustrates a portable electronic device with a fuel cell and a vibration actuator according to another embodiment.

Referring to FIGS. 2A-D, an example portable electronic device 100 including an actuator 140 and a fuel cell assembly 150 is shown according to various embodiments. In FIGS. 2A and 2B a generic actuator 140 having a moveable portion 142 is shown, which may comprise any type of actuator for producing vibrations as known in the art, including, without limitation, rotary actuators, piezoelectric actuators, and linear actuators. In FIGS. 2C and 2D, the actuator 140 comprises a rotary actuator having a rotatable element 144 which may be rotated by a motor 146. The rotatable element 144 may, for example, comprise an unbalanced weight or the like. Generally speaking, a typical actuator includes a fixed portion, which remains substantially immobile with respect to the device 100 as a whole, and a moveable portion, which is configured to physically move with respect to the device 100 as a whole. The movable portion may include a mass that can move (e.g., rotatably or linearly or otherwise) as well. It is the physical movement of the moveable portion with respect to the fixed portion that causes the actuator 140 to cause all or part of the device 100 to seem to vibrate or otherwise move.

The fuel cell assembly 150 may include one or more components that generate electric current by way of a fuel cell reaction. In an example fuel cell reaction, hydrogen in a fuel (which may be in a liquid form, such as in the form of liquid methanol) reacts with oxygen (which may come from the atmosphere) to produce water and electric current. Depending upon the particular fuel and the particular fuel cell, there may be other products of the reaction as well. As schematically illustrated in FIGS. 2A-D, the fuel cell assembly 150 comprises a reaction area 152 having an inlet conduit 154 for introducing fuel from a fuel area 156 into the reaction area 152. In some embodiments, used fuel may exit the reaction area 152 through a recycling conduit 158 to return to the fuel area 156. A refill port 160 may be provided for introducing new fuel into the fuel cell assembly 150. An outlet port 162 may be provided for discharging spent fuel from the reaction area 152. In some embodiments the fuel area 156 comprises a storage tank or the like, and may include one or more settling zones where particulate contaminants in used fuel accumulate. In other embodiments fuel may simply be stored in an extended recycling conduit 158 connected back to the inlet conduit 154. Filters and other fuel conditioning elements (not shown) may be provided at various locations within the fuel system as known in the art.

In the examples illustrated in FIGS. 2A-D, linkages 200A-D are respectively provided between the actuator 140 and the fuel cell assembly 150. By leveraging the motion of the actuator 14, improved performance of the fuel cell assembly 150 and/or increased efficiency may be provided in some embodiments as described below. Also, use of the actuator 140 for inducing motion in portions of the fuel cell assembly 150 may avoid the need for separate components for fuel cell management, thereby advantageously reducing form factor and/or cost in some embodiments.

In the FIG. 2A example, the linkage 200A has a first end 210A connected to the moveable portion 142 of actuator 140, and a second end 220A which passes through the inlet conduit 154. The second end 220A has one or more apertures (not shown in FIG. 2A) therein, and is moveable with respect to the inlet conduit 154 between an open position wherein the apertures are within the inlet conduit 154 such that fuel may pass into the reaction area 152, and a closed position wherein the apertures are outside the inlet conduit 154 such that fuel may not pass into the reaction area 152. The second end 220A may, for example, be slidably received in pressure seals (not shown in FIGS. 2A-D, see FIGS. 3B-C) in opposed walls of the inlet conduit 154, to permit linear motion of the second end 220A between the open and closed positions. Alternatively, the second end 220A may be slidably received in a single pressure seal (see FIGS. 3D-E) in one of the walls of the inlet conduit 154 and may be configured to abut an opposite wall of the inlet conduit 154. The second end 220A of linkage 200A thus acts as a fuel gate for controlling the flow of fuel into the reaction area 152. In some embodiments, the fuel in the fuel area 156 may be maintained at a higher pressure than the interior of the reaction area 152, such that when the second end 220A is in the open position, fuel will be automatically forced through the inlet conduit 154. In some embodiments, the actuator 140 and linkage 200A may be configured such that when the actuator 140 is not being used to induce vibration, the second end 220A of linkage 200A is in the closed position, such that fuel is only introduced into the reaction area 152 when vibration is induced. In some embodiments, vibration is only induced by the actuator 140 through the normal operation the portable electronic device (e.g., due to incoming messages/calls, etc.), thus providing increased efficiency. In some embodiments, the processor 102 may monitor the status of the fuel cell assembly 150 and cause the actuator 140 to induce vibration when fuel is needed in the reaction area 152, thus providing improved fuel cell performance.

In the FIG. 2B example, the linkage 200B extends between (or is physically disposed between) the actuator 140 and the fuel cell assembly 150. In FIG. 2B, the linkage 200B has a first end 210B connected (or physically coupled) to the moveable portion 142 of the actuator 140, and a second end 220B connected to or abutting the fuel area 156. Motions, such as vibrations induced or generated by the actuator 140 when the moveable portion moves with respect to the fixed portion, are transferred to the fuel area 156. The physical motion transferred from the actuator 140 to the fuel cell area 156 may, for example, mix the fuel contained therein. The physical motion may have other effects as well, such as moving the fuel, stopping movement of the fuel, controlling the flow or rate of movement of fuel, moving the products of the reaction, separating out contaminants or bubbles, or urging the fuel into particular places or spaces, In some embodiments, the second end 220B extends into the fuel area 156 (for example through one or more suitable pressure seals, not shown) for directly mixing the fuel. In some embodiments, the second end 220B abuts a portion of the fuel area such as, for example, the lid of a fuel tank, for inducing vibrations in the fuel area 156 to mix the fuel. In some embodiments, vibration is only induced by the actuator 140 through the normal operation the portable electronic device (e.g., due to incoming messages/calls, etc.), thus providing increased efficiency. In some embodiments, the processor 102 may monitor the status of the fuel cell assembly 150 and cause the actuator 140 to induce vibration when mixing of the fuel in the fuel area 156 is needed, thus providing improved fuel cell performance.

The FIG. 2C example is similar to the FIG. 2A example, in that the second end 220C of the linkage 200C acts as a fuel gate for controlling the flow of fuel through the inlet conduit 154 into the reaction area 152. The linkage 200C in FIG. 2C differs from the linkage 200A in FIG. 2A in that the first end 210C is pivotally connected to the rotatable element 144 by a pivot mount 212C. The linkage 200C thus converts rotary motion of the rotatable element 144 into substantially linear movement of the second end 220C. The radial location of the pivot mount 212C on the rotatable element 144 may be selected based on a desired range of motion of the second end 220C. In some embodiments, the pivot mount 212O may be positioned near an outer edge of the rotatable element 144 to maximize the range of motion of the second end 220C.

The FIG. 2D example is similar to the FIG. 2B example, in that the second end 220D of the linkage 200D is connected to or abuts the fuel area 156 for mixing the fuel contained therein. The linkage 200D in FIG. 2D differs from the linkage 200B in FIG. 2B in that the first end 210D is pivotally connected to the rotatable element 144 by a pivot mount 212D. The linkage 200D thus converts rotary motion of the rotatable element 144 into substantially linear movement of the second end 220D. The radial location of the pivot mount 212D on the rotatable element 144 may be selected based on a desired range of motion of the second end 220D. In some embodiments, the pivot mount 212D may be positioned near an outer edge of the rotatable element 144 to maximize the range of motion of the second end 220D.

Figure 3:
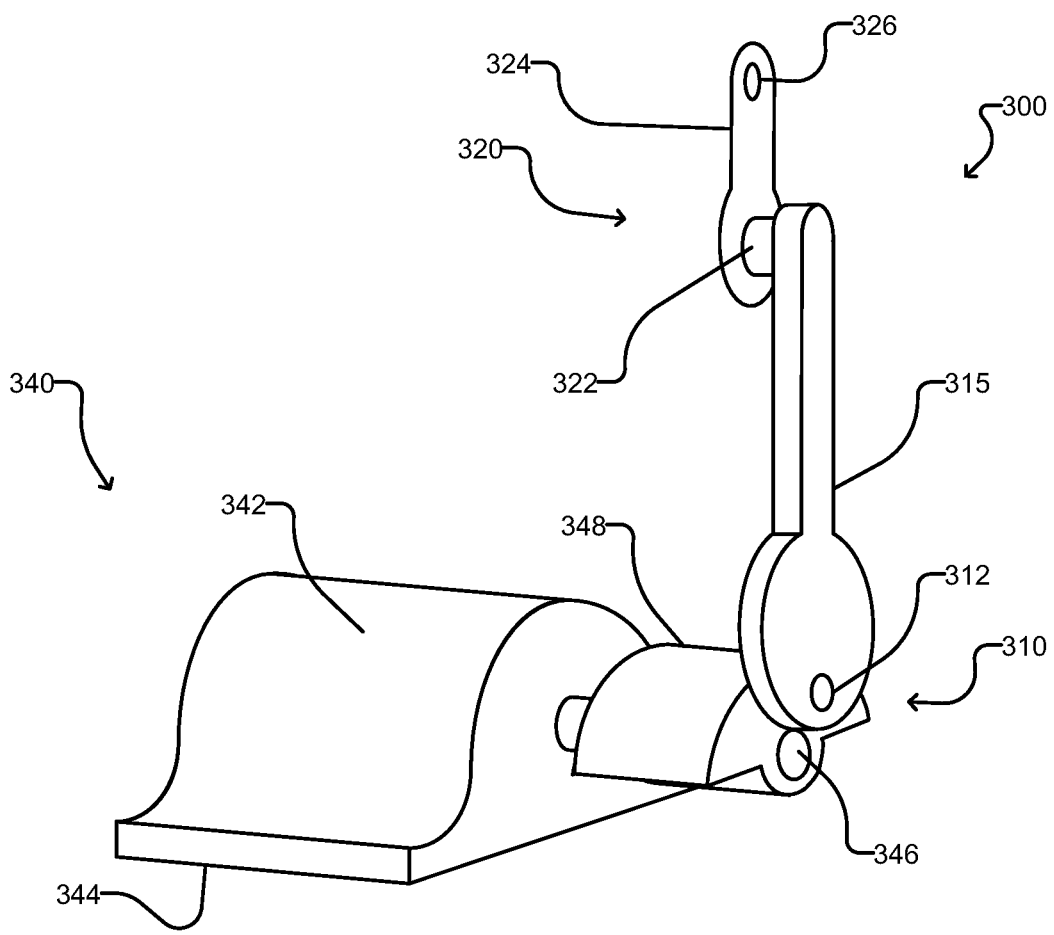
FIG. 3 shows an example linkage coupled to a rotatable element of an actuator according to one embodiment.

FIG. 3 shows an example linkage 300 according to one embodiment. The linkage 300 comprises a first end 310 coupled to an actuator 340 and a second end 320 moveable to control fuel flow in a conduit. The actuator 340 comprises a motor 342 mounted on a base 344. The base 344 may be coupled to any convenient surface within an electronic device. The motor 342 spins an axle 346 having an unbalanced weight 348 attached thereto.

The first end 310 of linkage 300 is pivotally connected to the weight 348 by a pivot mount 312. A plunger 315 extends toward a fuel cell assembly (not shown in FIG. 3) in a direction generally perpendicular to the axis of rotation of the weight 348. A second pivot mount 322 at the second end 320 of linkage 300 pivotally connects a fuel gate 324 to the plunger 315. An aperture 326 is provided in the fuel gate 324 for controlling fuel flow as described below with reference to FIGS. 3B and 3C.

Figure 3A:
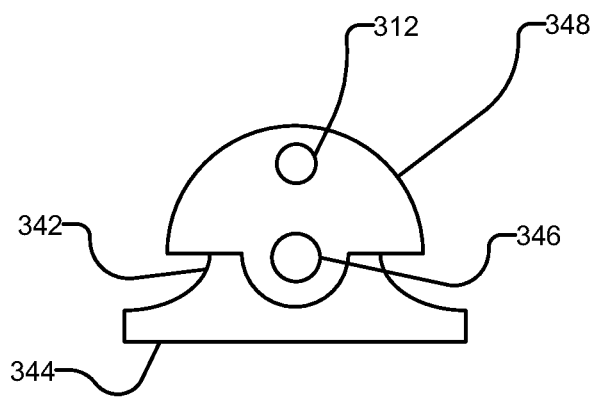
FIG. 3A illustrates an example attachment position of the linkage of FIG. 3.

FIG. 3A is a view of the actuator 340 looking along the axis of rotation of the weight 348 illustrating an example relative positioning of the pivot mount 312 and the axle 346. The spacing between the pivot mount 312 and the axle 346 may be selected to produce a desired range of motion of the fuel gate 324.

Figure 3B:
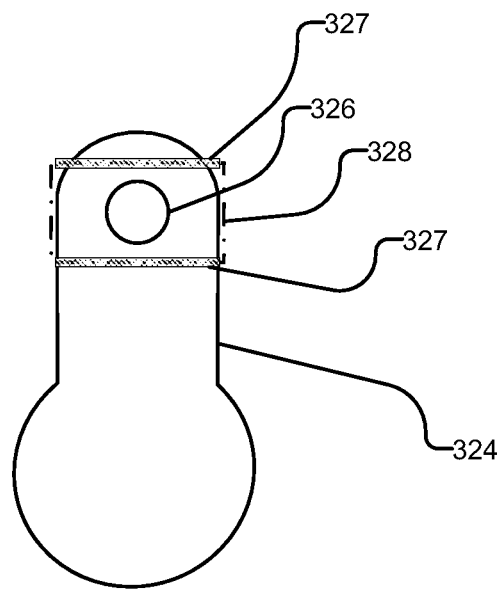
FIG. 3B schematically illustrates the fuel gate of FIG. 3 in an open position relative to an inlet conduit according to one embodiment.
Figure 3C:
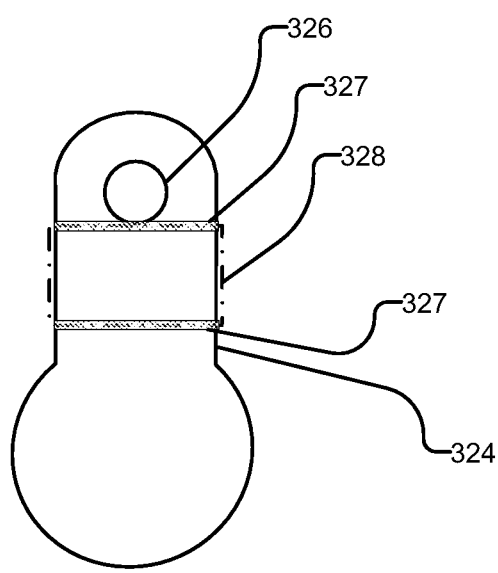
FIG. 3C shows the fuel gate of FIG. 3B in a closed position.

FIGS. 3B and 3C schematically illustrate the fuel gate 324 of FIG. 3 in relation to an example conduit 328 in an open position and a closed position, respectively. The conduit 328 is slightly wider than the portion of the fuel gate 324 which extends therethrough. The conduit 328 has pressure seals 327 in opposed walls to permit the fuel gate 324 to slidably move therethrough without allowing fuel to leave the conduit 328. In the illustrated example, the fuel gate 324 is in the open position wherein the aperture 326 is within the conduit 328 as shown in FIG. 3B when it is closest to the actuator 340, and in the closed position when it is farthest from the actuator 340, but this is not required in all embodiments. For example, by altering the position of the aperture 326, the fuel gate 324 could be configured to be in the open position when farthest from the actuator 340 and in the closed position when closest to the actuator 340.

Figure 3D:
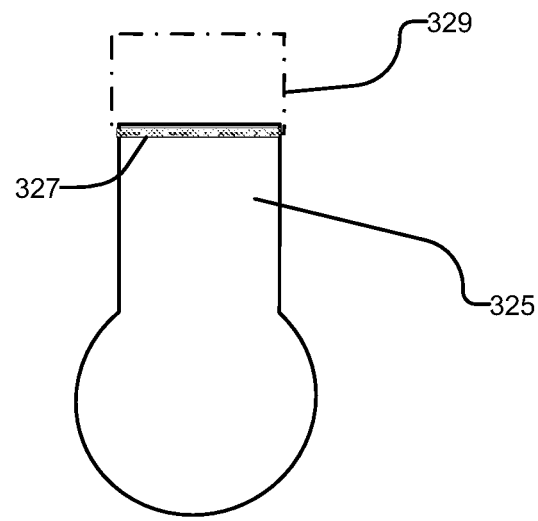
FIG. 3D schematically illustrates an example fuel gate according to another embodiment in an open position relative to an inlet conduit.
Figure 3E:
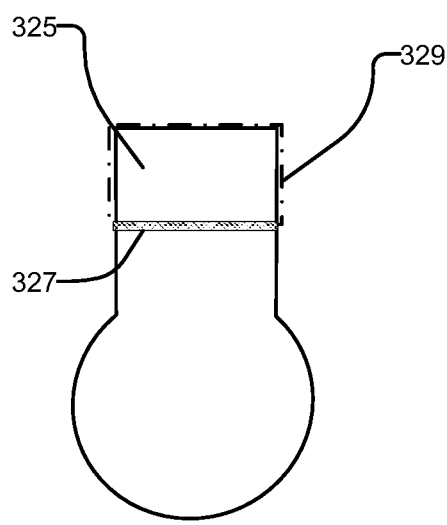
FIG. 3E shows the fuel gate of FIG. 3D in a closed position.

FIGS. 3D and 3E schematically illustrate an example fuel gate 325 according to another embodiment in relation to an example conduit 329 in an open position and a closed position, respectively. The conduit 329 has a single pressure seal 327 in one wall thereof to permit the fuel gate 325 to slidably move therethrough without allowing fuel to leave the conduit 329. The fuel gate 325 of FIGS. 3D and 3E differs from the fuel gate 324 of FIGS. 3B and 3C in that the fuel gate 325 has no aperture therein, and in that the end of the body of the fuel gate 325 is configured to abut the wall of the conduit 329 opposite the single pressure seal 327.

Figure 4:
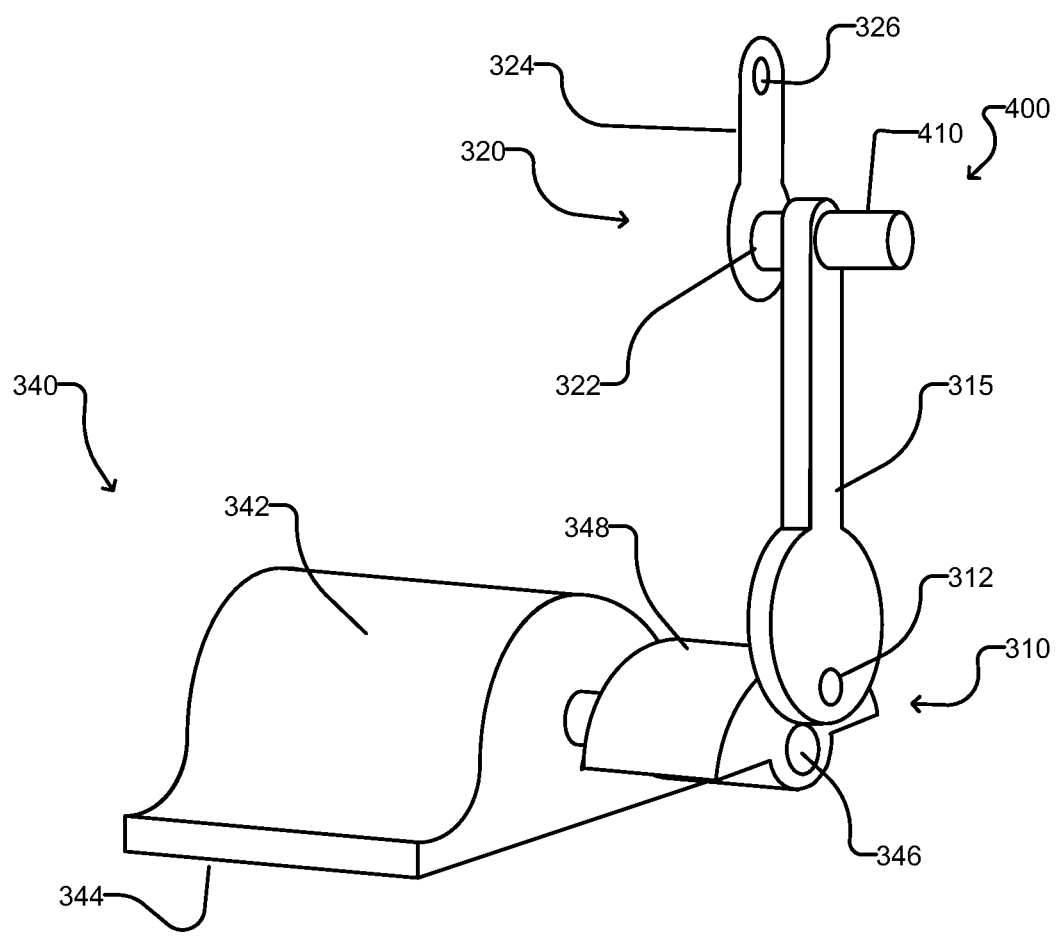
FIG. 4 shows an example linkage coupled to a rotatable element of an actuator according to another embodiment.

FIG. 4 shows an example linkage 400 according to another embodiment. The FIG. 4 embodiment is substantially similar to the FIG. 3 embodiment, and corresponding elements are identified with the same reference numerals and will not be described again to avoid repetition. The linkage 400 of FIG. 4 differs from the FIG. 3 embodiment in that an extension 410 is provided at the second end 310 of the linkage 400. The extension 410 is only illustrated schematically in FIG. 4, and may have different configurations depending on the function performed by the extension 410 and the particular structure of the fuel cell assembly with which the linkage 400 is to be used. In some embodiments, the extension 410 is configured to extend into a fuel storage area (e.g. a fuel tank) for directly mixing fuel. In some embodiments, the extension 410 is configured to be directly attached to a portion of a fuel storage area (e.g. a lid of a fuel tank) for inducing vibrations in the fuel storage area. In some embodiments, the extension 410 is configured to abut a portion the fuel area, and a flexible connection may be provided between the portion of the fuel area abutted by the extension 410 and an inlet conduit leading from the fuel area to a reaction area, in order to permit the fuel gate 324 to open and close the inlet conduit as discussed above. As one skilled in the art will appreciate, a variety of particular structures of the extension 410 are possible.

One or more embodiments may realize one or more benefits, some of which have been mentioned already, such as enhanced efficiency, improved fuel cell performance, reduced cost and/or adaptability to small form factors. Further, various embodiments are generally adaptable to a variety of devices and sizes and form factors. The concepts are further applicable to a variety of geometries and arrangements of device components.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A portable electronic device comprising:
   a fuel cell assembly;
   an actuator for inducing vibration to provide vibration alerts in the portable electronic device, the actuator comprising a fixed portion and a moveable portion; and
   a linkage extending between the actuator and the fuel cell assembly having a first end connected to the moveable portion of the actuator and a second end coupled to the fuel cell assembly, wherein motion of the moveable portion in response to activation of a vibration alert transfers motion of the actuator to the fuel cell assembly to move fuel in the fuel cell assembly, wherein the fuel cell assembly comprises a fuel storage area, and wherein the second end of the linkage is coupled to the fuel storage area for mixing fuel.

2. The portable electronic device of claim 1 wherein the fuel cell assembly comprises a reaction area and a conduit for controlling fuel flow to the reaction area, and wherein the second end of the linkage is movable to open and close the conduit.

3. The portable electronic device of claim 2 wherein the conduit comprises an inlet conduit for introducing fuel into the reaction area.

4. The portable electronic device of claim 3 wherein the moveable portion of the actuator comprises a rotatable element, and wherein the first end of the linkage is pivotally connected to the rotatable element.

5. The portable electronic device of claim 4 wherein the linkage comprises a plunger pivotally connected to the rotatable element and a fuel gate moveable to open and close the conduit pivotally connected to the plunger.

6. The portable electronic device of claim 5 wherein the fuel gate comprises one or more apertures, the one or more apertures positioned within conduit when the fuel gate is in an open position and positioned outside of the conduit when the fuel gate is in a closed position.

7. The portable electronic device of claim 6 wherein the actuator and linkage are configured such that the fuel gate remains in the closed position unless the actuator is activated.

8. The portable electronic device of claim 6 wherein the fuel gate is slidably received in a pressure seal through a wall of the conduit.

9. The portable electronic device of claim 5 wherein the second end of the linkage further comprises an extension coupled to the fuel storage area for mixing fuel.

10. The portable electronic device of claim 9 wherein the extension extends into the fuel storage area for directly mixing fuel.

11. The portable electronic device of claim 9 wherein the extension abuts a portion of the fuel storage area to induce vibrations in the fuel storage area for mixing fuel.

12. The portable electronic device of claim 1 wherein the moveable portion of the actuator comprises a rotatable element, and wherein the first end of the linkage is pivotally connected to the rotatable element.

13. A portable electronic device comprising:
   a fuel cell assembly;
   an actuator for inducing vibration in the portable electronic device, the actuator comprising a fixed portion and a moveable portion; and
   a linkage extending between the actuator and the fuel cell assembly having a first end connected to the moveable portion of the actuator and a second end coupled to a portion of the fuel cell assembly to transfer motion of the actuator to the portion of the fuel cell assembly, wherein the fuel cell assembly comprises a fuel storage area, and wherein the second end of the linkage is coupled to the fuel storage area for mixing fuel.

14. The portable electronic device of claim 13 wherein the moveable portion of the actuator comprises a rotatable element, and wherein the first end of the linkage is pivotally connected to the rotatable element.

15. The portable electronic device of claim 14 wherein the second end of the linkage extends into the fuel storage area for directly mixing fuel.

16. The portable electronic device of claim 14 wherein the second end of the linkage abuts a portion of the fuel storage area to induce vibrations in the fuel storage area for mixing fuel.

17. A method for controlling fuel flow in a portable electronic device comprising a fuel cell assembly, a linkage and an actuator for inducing vibration to provide vibration alerts in the portable electronic device, the fuel cell assembly comprising a reaction area and a conduit for controlling fuel flow to the reaction area, the actuator comprising a fixed portion and a moveable portion, the linkage having a first end connected to the moveable portion of the actuator and a second end moveable to open and close the conduit, the method comprising:
   activating the actuator in response to activation of a vibration alert and thereby controlling fuel flow to the reaction area of the fuel cell assembly.

18. A method for mixing fuel in a portable electronic device comprising a fuel cell assembly, a linkage and an actuator for inducing vibration in the portable electronic device, the fuel cell assembly comprising a fuel storage area, the actuator comprising a fixed portion and a moveable portion, the linkage having a first end connected to the moveable portion of the actuator and a second end coupled to the fuel storage area, the method comprising:
   activating the actuator to mix fuel in fuel storage area of the fuel cell assembly.

* * * * *